(12) United States Patent
Holmes et al.

(10) Patent No.: US 10,472,044 B2
(45) Date of Patent: Nov. 12, 2019

(54) AIRCRAFT JOINT

(71) Applicant: AIRBUS OPERATIONS LIMITED, Bristol (GB)

(72) Inventors: Vernon Holmes, Bristol (GB); Rodney Evans, Bristol (GB); Stefanos Kosteletos, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 260 days.

(21) Appl. No.: 15/592,788

(22) Filed: May 11, 2017

(65) Prior Publication Data

US 2017/0327202 A1 Nov. 16, 2017

(30) Foreign Application Priority Data

May 11, 2016 (EP) .................................. 16386006

(51) Int. Cl.
*B64C 3/26* (2006.01)
*B64C 1/26* (2006.01)

(52) U.S. Cl.
CPC . *B64C 3/26* (2013.01); *B64C 1/26* (2013.01)

(58) Field of Classification Search
CPC ................ B64C 1/26; B64C 3/26; B64C 3/28
USPC ......................................................... 244/131
See application file for complete search history.

(56) References Cited

U.S. PATENT DOCUMENTS

| | | | | | |
|---|---|---|---|---|---|
| 2,621,357 | A | * | 12/1952 | Stuman ................. | F24C 15/024 16/422 |
| 2,704,680 | A | * | 3/1955 | Bedford, Jr. .......... | F16B 37/041 24/627 |
| 3,382,416 | A | * | 5/1968 | Jacobs .................. | F16B 5/0233 361/645 |
| 4,557,457 | A | * | 12/1985 | Cockfield .............. | A47G 1/162 248/220.1 |
| 4,783,034 | A | * | 11/1988 | Ostrander .............. | F16B 21/09 248/221.12 |
| 5,014,934 | A | * | 5/1991 | McClaflin ............. | B64C 1/12 244/129.4 |
| 8,016,237 | B2 | * | 9/2011 | Berry ..................... | B64C 1/12 244/131 |
| 8,634,177 | B2 | * | 1/2014 | Kawahara .............. | B64C 3/34 361/117 |
| 9,038,953 | B2 | * | 5/2015 | Lang ..................... | B29C 65/562 244/132 |

(Continued)

FOREIGN PATENT DOCUMENTS

EP 2712803 A1 4/2014
FR 3017668 A1 8/2015

OTHER PUBLICATIONS

Communication dated Oct. 24, 2016 in EP Appln No. 16386006.7.

*Primary Examiner* — Claude J Brown
(74) *Attorney, Agent, or Firm* — Nixon & Vanderhye P.C.

(57) ABSTRACT

An aircraft joint between overlapping first and second components includes a fastener having a head and a shank, and a fastener retainer fixedly attached to the second component at the overlap region. The fastener retainer has a recess and a through hole. The fastener head is situated in the recess and between the fastener retainer and the second component. The fastener shank extends through the hole in the fastener retainer and into the first component to fasten the first component to the second component. The joint may be between an aircraft wing cover and a wing panel.

14 Claims, 9 Drawing Sheets

Section B-B

(56) References Cited

U.S. PATENT DOCUMENTS

2004/0124311 A1* 7/2004 Kordel .................... B64C 3/26
                                                    244/131
2010/0308170 A1* 12/2010 Hadley .................... B64C 1/12
                                                    244/131
2011/0233338 A1* 9/2011 Stewart .................... B64C 3/28
                                                    244/131
2016/0244143 A1* 8/2016 Foster .................... B64C 3/26

* cited by examiner

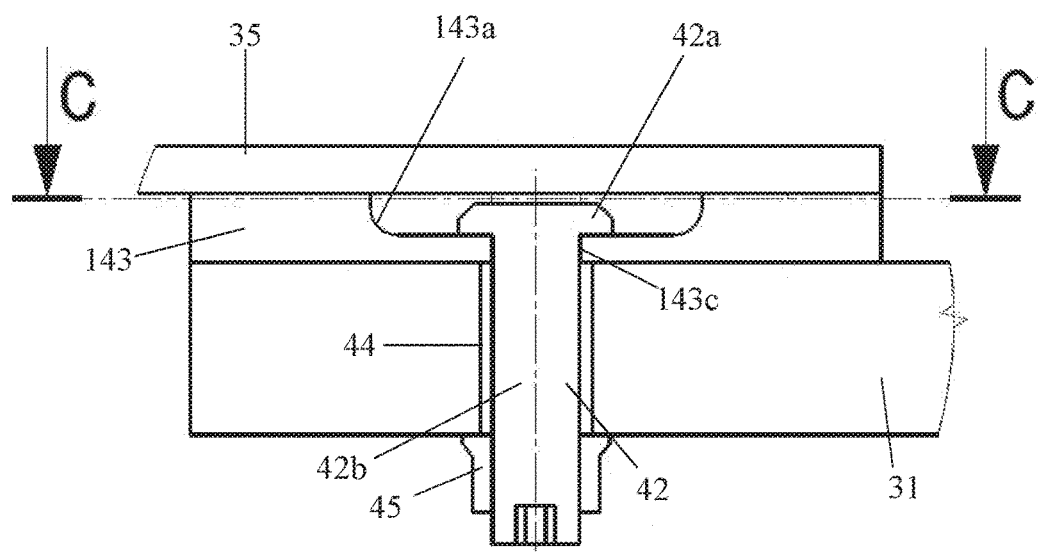
Fig. 8
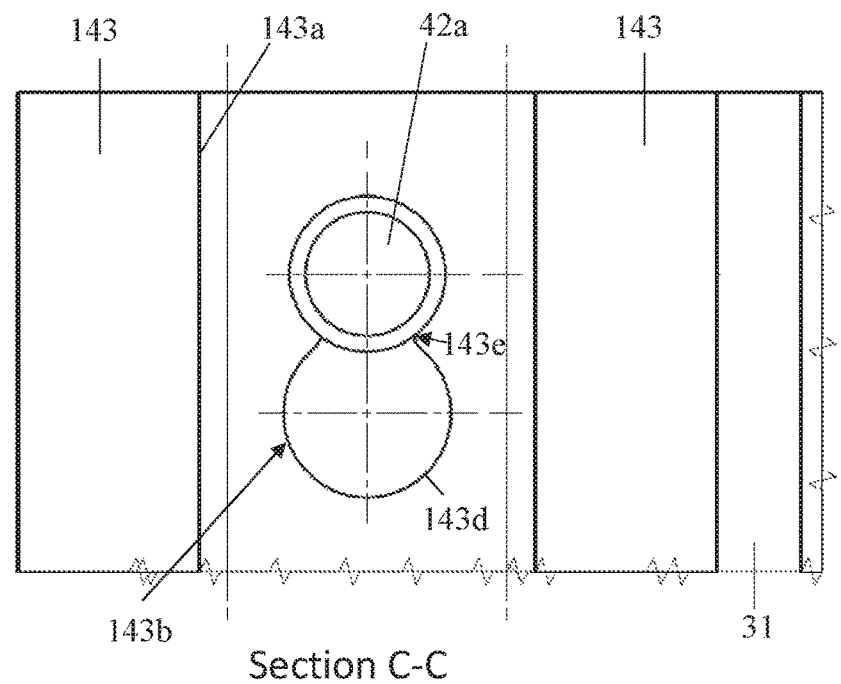
Section C-C

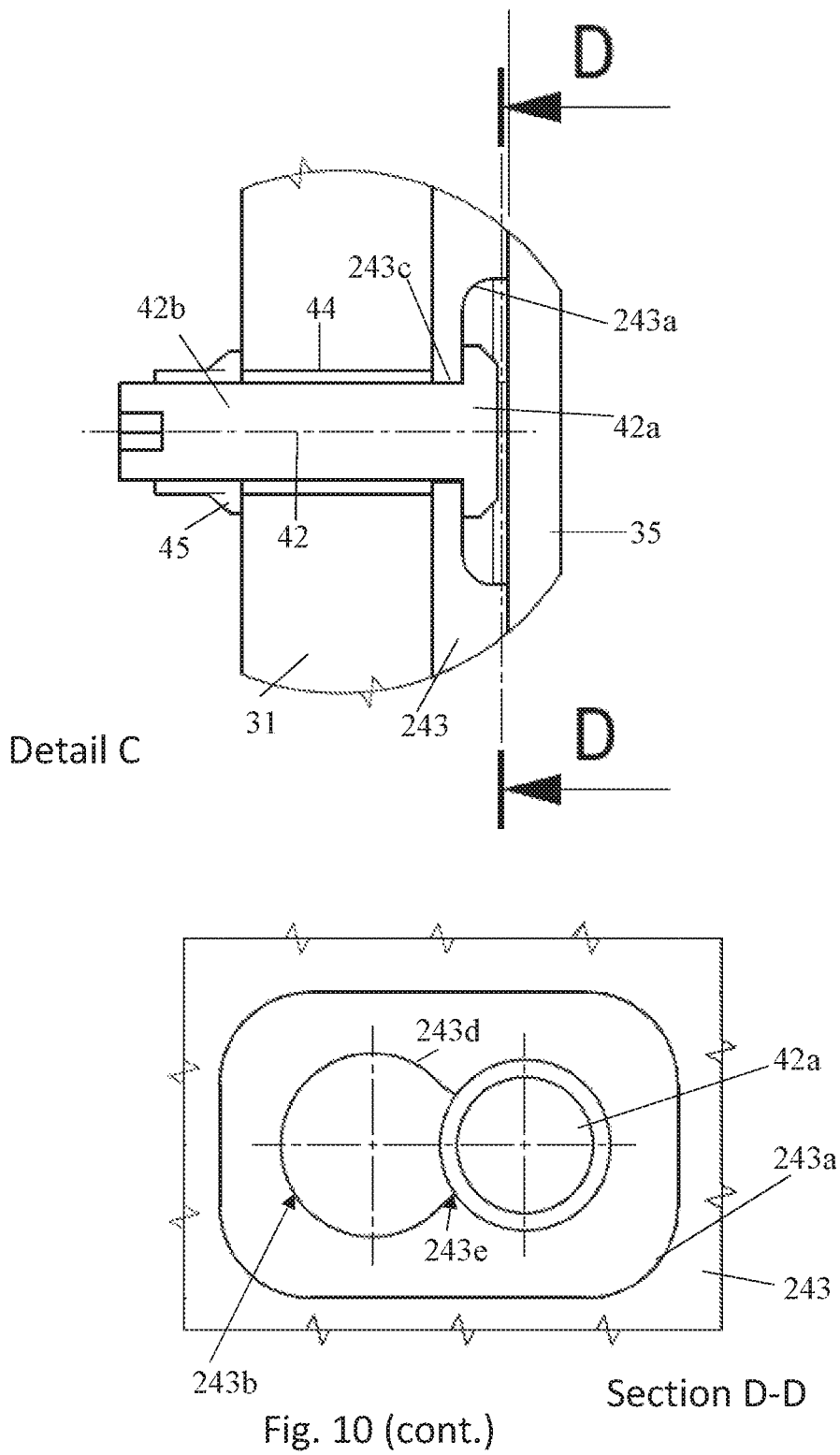

AIRCRAFT JOINT

RELATED APPLICATIONS

The present application claims priority from European Application No. 16386006.7, filed May 11, 2016, the disclosure of which is hereby incorporated by reference herein in its entirety.

FIELD OF THE INVENTION

The present invention relates to a joint between two components. The invention also relates to a method of forming such a joint.

BACKGROUND OF THE INVENTION

Aircraft wings commonly comprise a wing box structure with spanwise extending front and rear spars, and ribs extending chordwise between the front and rear spars. Upper and lower wing covers extend between the spars to form the upper and lower boundaries of the wing box. Leading and trailing edge structures, forward and aft of the front and rear spars respectively, typically comprise ribs and panels. Trailing edge panels are commonly substantially planar, whereas leading edge panels are commonly curved.

The covers and panels are typically fastened to the ribs and spars. The leading and trailing edge panels may extend spanwise across multiple ribs. The panels are typically joined to the wing covers e.g. by fastening butt-straps across the interior side of the joint, or by providing a joggle at the edge of the wing cover adjacent the panel and fastening the panel to the wing cover at the joggle.

In recent years there have been significant research developments into aerofoils which achieve natural laminar flow. Natural laminar flow aerofoils achieve laminar flow over the upper aerodynamic surface for a greater percentage of the wing chord than does a traditional turbulent wing. Active boundary layer control (e.g. suction devices) may be used to promote laminar flow but natural laminar flow wings achieve this passively. Natural laminar flow wings are designed (mostly by control of camber and leading edge radius) to achieve favourable pressure gradients resulting in significant runs of laminar flow. Laminar flow is typically limited in chordwise extent by shocks or boundary layer flow separation.

Surface roughness of the outer aerodynamic surface, particularly at the upper surface leading edge, will significantly affect the ability to achieve laminar flow. A laminar flow transonic aircraft fixed wing upper surface preferably has a maximum step height below 50 microns over at least 30% of the aerofoil chord from the aerodynamic leading edge. The fastener heads and fastener holes conventionally used to attach leading edge panels to leading edge ribs and to the wing covers are unlikely to be able to satisfy this step condition.

Furthermore, aircraft wing leading edge panels are subjected to particularly harsh environmental conditions. Hail, rain, ice, dust, debris, insects, birds and lightning are examples of items that may strike the exposed wing leading edge. Over time or after a significant impact it may become necessary to replace the leading edge panel. Removal of very many fasteners joining the leading edge panel to the leading edge ribs and the wing cover, and installation of a new panel again with very many fasteners, is time consuming leading to costly downtime of the aircraft for maintenance. This problem may be exacerbated by a move to natural laminar flow aerofoils, as the tighter tolerance for surface smoothness may lead to more frequent leading edge panel replacements. Reducing the time for replacement of the leading edge panel is therefore desirable.

SUMMARY OF THE INVENTION

A first aspect of the invention provides an aircraft joint comprising a first component, a second component overlapping the first component at an overlap region, a fastener having a head and a shank, and a fastener retainer fixedly attached to the second component at the overlap region, wherein the fastener retainer has a recess and a through hole, the fastener head is situated in the recess and between the fastener retainer and the second component, and the fastener shank extends through the hole in the fastener retainer and into the first component to fasten the first component to the second component.

A further aspect of the invention provides a method of assembling an aircraft joint according to the first aspect, the method comprising: inserting the fastener shank through the hole in the fastener retainer until the fastener head is situated in the recess in the fastener retainer; attaching the fastener retainer to the second component; positioning the second component having the fastener retainer attached thereto and with the fastener therein with respect to the first component; and fastening the first component to the second component using the fastener.

The invention is advantageous in that the fastener is fully concealed within the overlap region and does not extend through the second component. This improves the ability to retain laminar flow at the aircraft joint where this is desirable. Since the fastener does not extend through the second component ease of assembly and/or disassembly of the joint is facilitated.

The fastener shank may be threaded. For example, the fastener shank may have a threaded end opposite the head and an unthreaded portion between the head and the threaded end. The unthreaded portion may extend along the thickness of a hole in the first component. The hole in the first component may be of a larger diameter than the unthreaded portion of the fastener to enable quick insertion and removal of the fastener from the hole.

The aircraft joint may further comprise a fastener receptacle which receives the fastener shank. The fastener receptacle may be an internally threaded nut. The threaded nut may be threadably received on the threaded end of the fastener shank.

The fastener receptacle (nut) may be removable from the fastener shank.

A wide variety of threaded and unthreaded fasteners and mating fastener receptacles may be used, e.g. nut, bolt, quarter turn, etc.

The fastener retainer may be attached to the second component by one or more of bonding, fastening or welding. For example, where the second component comprises composite material, e.g. carbon fibre reinforced polymer, the fastener retainer may be attached by bonding and/or fastening. The fastening preferably does not extend though the full thickness of the second component. Where the second component and the fastener retainer each comprise a metallic material then the second component and the fastener retainer may be attached by welding.

The fastener retainer may be a plate or strip. The plate or strip may be substantially planar. The fastener retainer may comprise a metallic material.

The fastener head may be held captive in the fastener retainer recess between the fastener retainer and the second component. The through hole in the fastener retainer may have a diameter smaller than a diameter of the fastener head. The fastener shank is inserted through the hole in the fastener retainer prior to attaching the fastener retainer to the second component. In this way the fastener is a 'captive' fastener when the fastener head is in the recess and the fastener retainer is attached to the second component. The captive fastener is only removable by splitting apart the fastener retainer and the second component. However, it is intended that removal of the fastener from the fastener retainer is not required in order to disassemble the joint.

In an alternative arrangement the fastener is not a captive fastener. The through hole in the fastener retainer may have a first aperture having a diameter smaller than a diameter of the fastener head, and a second aperture adjacent the first aperture and having a diameter larger than the diameter of the fastener head, and a slot between the first aperture and the second aperture. Unlike the captive fastener arrangement above, the fastener shank may be inserted through the hole (via the second aperture) in the fastener retainer after attaching the fastener retainer to the second component. Of course, the fastener shank may be inserted through the hole (via the first aperture) in the fastener retainer from the other side before attaching the fastener retainer to the second component where desired.

In this alternative arrangement the fastener may be slidable in the slot between the first aperture and the second aperture of the fastener retainer only when the first and second components are disassembled. The fastener may be removable from the fastener retainer through the second aperture only when the first and second components are disassembled. The first component may have a through hole which receives the fastener shank and is co-axial with the first aperture of the fastener retainer. The first component may have no through hole co-axial with the second aperture of the fastener retainer.

The aircraft may further comprise a plurality of the fasteners, wherein the fastener retainer has a plurality of through holes, each fastener head is situated in a recess of the fastener retainer and between the fastener retainer and the second component, and each fastener shank extends through a respective one of the through holes and into the first component.

The first component may have a 'joggle'. A joggle comprises a proximal portion, a distal portion extending substantially parallel with the proximal portion, and a ramp or step between the proximal and distal portions. The ramp may extend at an angle to the proximal and distal portions.

The fastener shank may extend into the distal portion of the first component.

The first component may have an outer aerodynamic surface, and the second component may have an outer aerodynamic surface. The fastener may constrain movement of the first component relative to the second component in a direction normal to the outer aerodynamic surfaces of first and second components in the vicinity of the fastener. The fastener may be fully concealed below the outer aerodynamic surfaces at the joint and have no parts exposed in the outer aerodynamic surfaces at the joint. This improves the ability to retain laminar flow at the joint where this is desirable.

The outer aerodynamic surfaces of the first and second components may be substantially flush across the joint.

The first and second components may be aircraft wing components. For example, the first and second components may be a wing cover and a wing panel. A wing cover (or skin) is a structural component of an aircraft wing box. By contrast a wing panel is a non-structural component, i.e. it does not carry the main wing loads and simply provides the aerodynamic shape of the wing. Wing panels are typically provided at the leading edge (forward of the wing front spar) and at the trailing edge (aft of the wing rear spar) of the wing.

Alternatively the first and second components may be an access panel and a surrounding structure or fairing. The access panel may be easily removed for access to services or the like behind the panel. The surrounding structure may be an aircraft fuselage, empennage, nose, etc. or a fairing, e.g. a belly fairing, wing root joint fairing, etc. The benefits of ease of assembly/disassembly of the joint may be enjoyed both in location where maintenance of laminar flow over the outer aerodynamic surfaces at the joint is important and in locations where this is not important.

The first and second components may be a wing upper cover and a wing leading edge panel. The wing leading edge panel may extend in a spanwise direction between leading edge ribs and across intermediate leading edge ribs. An aft edge of the wing leading edge panel extending between the spanwise ends may be coupled to the wing cover by the plurality of the fasteners and the fastener retainer.

Disassembly of the joint may comprise unfastening the fastener from the first component; and separating the second component having the fastener retainer attached thereto and with the fastener therein from the first component. Removal of the fastener from the fastener retainer may be achieved without removing the fastener retainer from the second component where the fastener is not held captive by the fastener retainer, or by splitting the fastener retainer from the second component where the fastener is a captive fastener.

BRIEF DESCRIPTION OF THE DRAWINGS

Embodiments of the invention will now be described with reference to the accompanying drawings, in which:

FIG. 8 illustrates detailed section views of the installed fastener in the joint of the second embodiment;

DETAILED DESCRIPTION OF EMBODIMENT(S)

Figure 1:
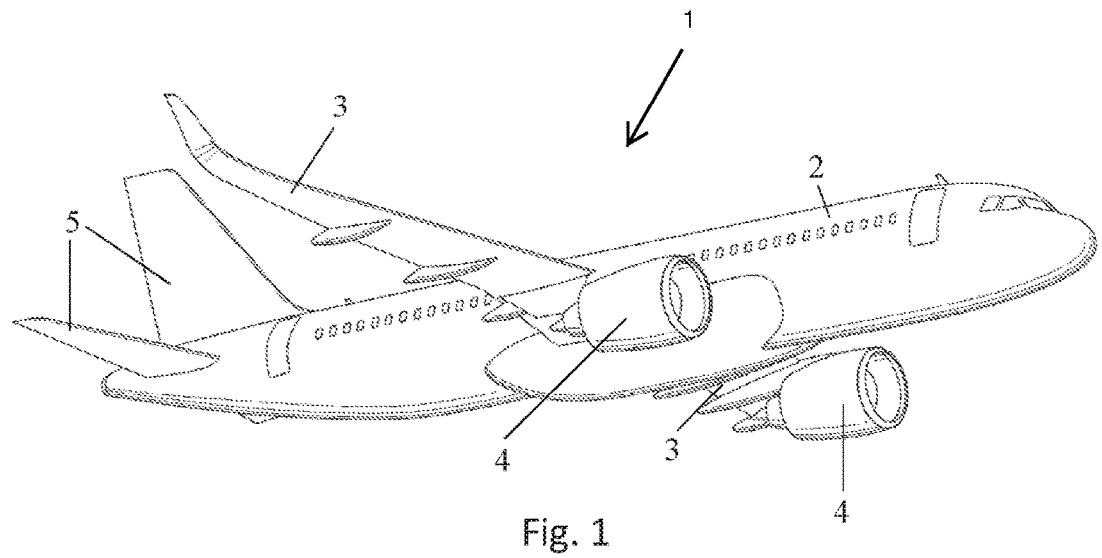
FIG. 1 illustrates a fixed wing aircraft.

FIG. 1 illustrates a typical configuration for a fixed wing passenger transonic jet transport aircraft 1. The aircraft 1 comprises a fuselage 2, wings 3, main engines 4 and horizontal and vertical tailplanes 5. It will be appreciated that this invention is applicable to a wide variety of aircraft types not just that illustrated in FIG. 1. For example, the aircraft, may be for commercial or military purposes, may be for transporting passengers or cargo, may have jet, propeller or other engine propulsion systems, may have a variety of fuselage/wing configurations, e.g. a high wing, low wing or blended wing body, and may be designed to fly at subsonic, transonic or supersonic speeds.

Figure 2:
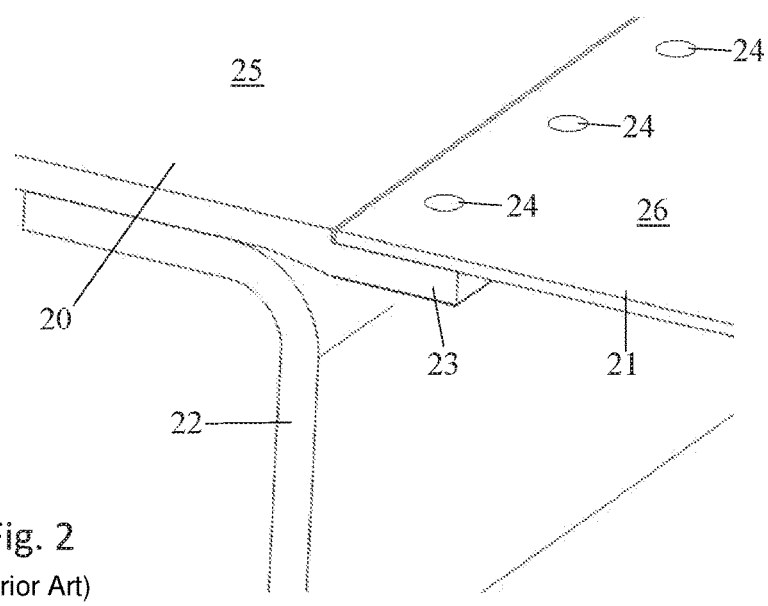
FIG. 2 illustrates schematically a known joint between an upper wing cover and a wing leading edge panel comprising a row of fasteners.

FIG. 2 illustrates a known joint between an upper wing cover 20 and a wing leading edge panel 21. The upper wing cover 20 is attached to a front spar 22. A forward edge of the upper wing cover 20 includes a joggle 23 and the wing leading edge panel 21 is fastened to the upper wing cover 20 by a plurality of fasteners 24. The outer surface 25 of the upper wing cover 20 and the outer surface 26 of the wing leading edge panel 21 are arranged substantially flush across the joint. The fasteners are countersunk but nevertheless the line of fasteners 24 provide exposed fastener heads which create a small but appreciable step in the upper surface of the wing adjacent the leading edge, which may have a detrimental effect on laminar flow.

Figure 3:
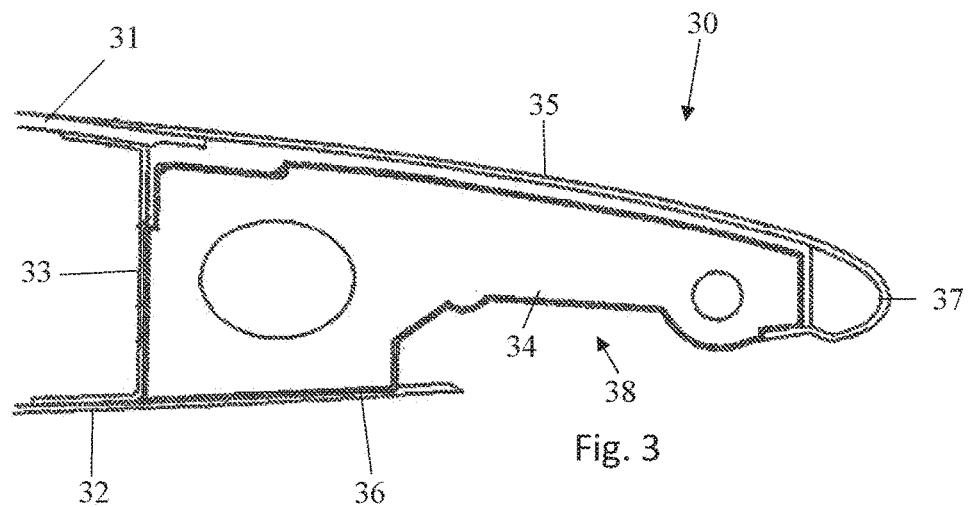
FIG. 3 illustrates a side view of a leading edge region of a laminar flow aerofoil for a fixed wing aircraft.

FIG. 3 illustrates a cutaway side view of the leading edge region of a laminar flow aerofoil for a fixed wing aircraft such as that shown in FIG. 1. The laminar flow wing 30 includes an upper wing cover 31, a lower wing cover 32, a front spar 33, a leading edge rib 34, an upper leading edge panel 35 and a lower leading edge panel 36.

The upper and lower wing covers 31, 32 are attached to the front spar 33. A plurality of the leading edge ribs 34 are provided spaced spanwise in front of the front spar 33 and are fixed thereto. The lower leading edge panel 36 extends spanwise across multiple leading edge ribs 34 and is attached to the ribs 34 and to the forward edge of the lower wing cover 32. The upper leading edge panel 35 also extends spanwise across a plurality of the leading edge ribs 34. The upper leading edge panel 35 extends forward of the upper wing cover 31 to the leading edge 37 of the wing 30 and curls under to attach to the underside of the rib 34 just aft of the wing leading edge 37. A cavity 38 is formed between the wing leading edge panels 37 and 36 which receives a Krueger flap high lift device (not shown). A joint 40 is used to attach upper leading edge panel 35 to the upper wing cover 31.

Figure 4:
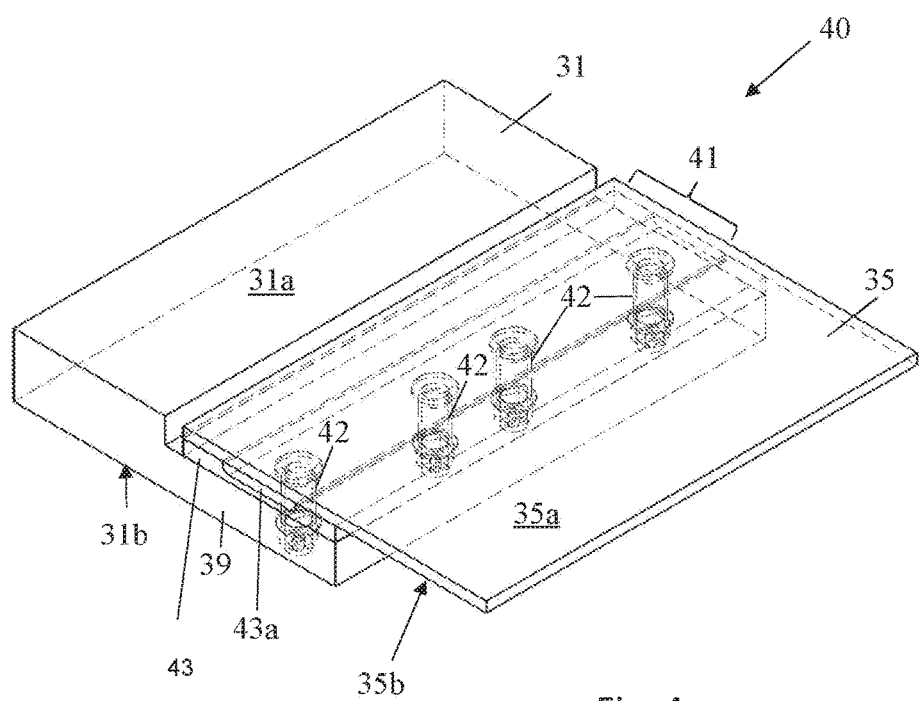
FIG. 4 illustrates a three dimensional view of a joint between a wing cover and a leading edge panel according to a first embodiment of the invention.

FIG. 4 shows an isometric view of the joint 40 between the upper wing cover 31 and the upper wing leading edge panel 35 according to a first embodiment of the invention. The upper wing cover 31 has an outer aerodynamic surface 31a and an inner surface 31b opposite the outer surface 31a. The upper wing leading edge panel 35 has an outer aerodynamic surface 35a and an inner surface 35b opposite the outer surface 35a. The forward edge of the upper wing cover 31 includes a joggle 39. The upper wing leading edge panel 35 overlaps the joggle 39 of the wing cover 31 to provide an overlap region 41 where the upper wing leading edge panel 35 overlaps the wing cover 31. A row of fasteners 42 in the overlap region 41 joins the upper wing leading edge panel 35 to the upper wing cover 31. A fastener retainer 43 is fixedly attached to the inner surface 35b of the upper wing leading edge panel 35.

Figure 5:
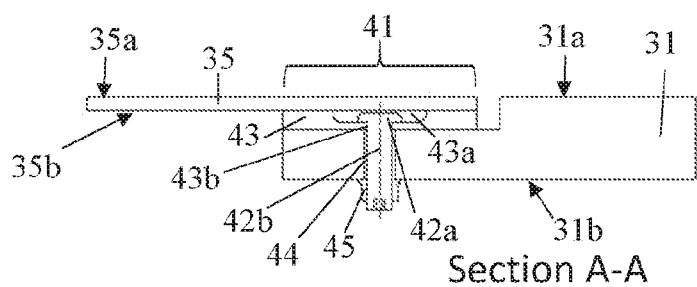
FIG. 5 illustrates plan and section views of the joint of FIG. 4.
Figure 5:
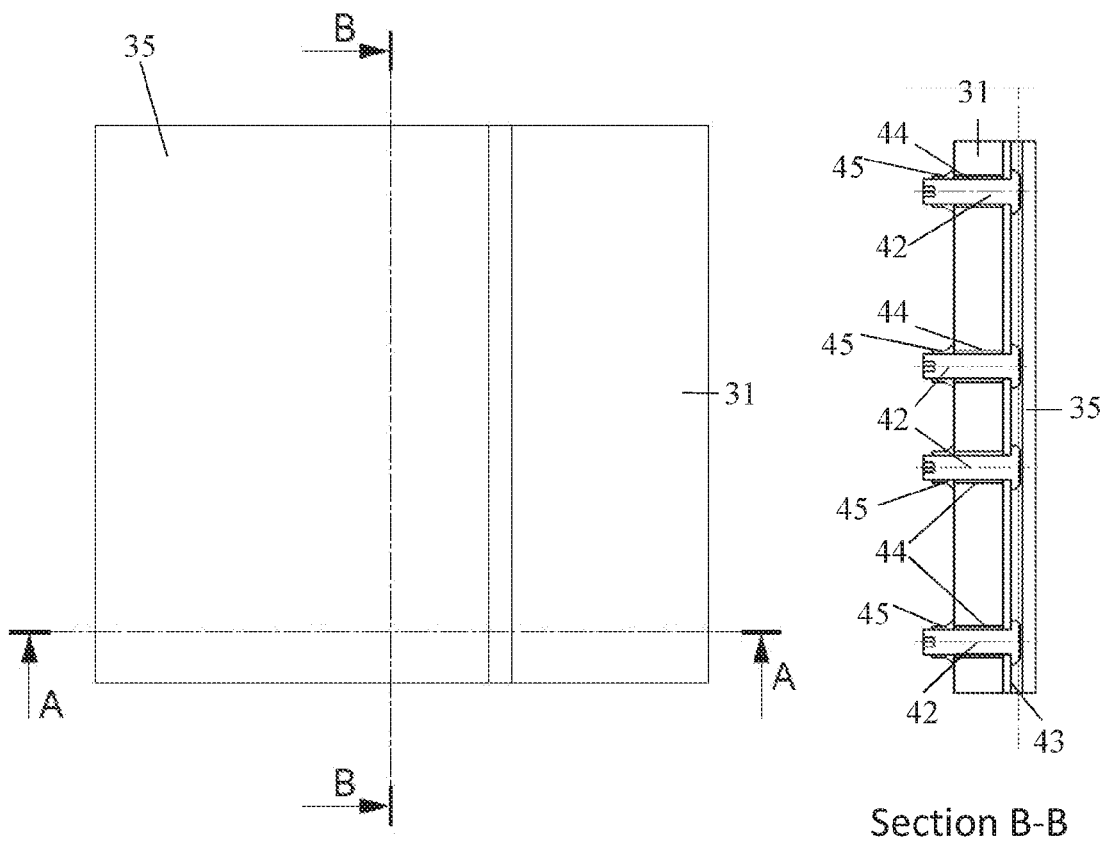

As best shown in FIG. 5, each of the fasteners 42 has a fastener head 42a and a fastener shank 42b. The fastener retainer 43 has a recess 43a which receives the fastener head 42a between the fastener retainer 43 and the upper wing leading edge panel 35. The fastener retainer 43 also has a through hole 43b and the fastener shank 42b extends through the hole 43b in the fastener retainer 43 and through a hole 44 in the upper wing cover 31. The hole 44 has a diameter larger than the diameter of the fastener shank to allow easy installation and removal of the fastener 42.

A fastener receptacle 45, which in the illustrated embodiment is a nut, receives a threaded end of the fastener shank 42b opposite the fastener head end. The fastener receptacle 45 has an internally threaded bore which is screw threaded onto the threaded end of fastener shank 42b. Tightening the fastener receptacle on the fastener shank causes the fastener receptacle 45 to bear (either directly or indirectly) against the inner surface 31b of the upper wing cover 31 so as to clamp the upper wing cover 31 to the fastener retainer 43. The fastener retainer 43 is attached by bonding to the inner surface 35b of the upper wing leading edge panel 35.

In the illustrated embodiment the fastener retainer 43 is a strip or plate having a recessed channel groove 43a along its length. The fastener receiving through holes 43b in the fastener retainer 43 are provided at discrete locations along the length of the recessed groove 43a. In an alternative arrangement (not shown) the recess maybe a discrete cut outs of required dimension around the respective fastener receiving through holes 43b in the fastener retainer 43 but, as in the illustrated embodiment, the recess 43a must be of sufficient dimension (depth and diameter) to receive the fastener head 42a.

With the fasteners 42 installed, movement of the upper leading edge panel 35 relative to the upper wing cover 31 in a vertical direction (i.e. normal to the outer surfaces 31a, 35a of the upper wing cover 31 and the upper wing leading edge panel 35) is constrained at the overlap region 41. The fasteners 42 therefore hold the wing leading edge panel 35 in contact with the joggled wing upper cover 31 and stops relative vertical movement between these components.

The outer aerodynamic surfaces of the upper wing cover 31 and the upper wing leading edge panel 35 are substantially flush across the joint 40. A small gap between the cover and the panel is filled with sealant (not shown) prior to use to create a contiguous aerodynamic surface across the joint. The fasteners 42 sit fully inside the wing 30 within the wing leading edge region and therefore avoiding any disturbance to the laminar flow around the outer surface of the wing 30.

As discussed above the fastener retainer 43 is attached to the inner surface 35b of the upper wing leading edge panel 35 by bonding. Any suitable aerospace adhesive similar may be used for this purpose. Since the leading edge panel 35 is a "panel" i.e. it does not carry the main wing loads and is provided simply to maintain the aerodynamic shape of the wing, bonding of the fastener retainer 43 to the upper wing leading edge panel 35 is sufficient. It will be appreciated that in other embodiments the fastener retainer 43 may be attached to the upper wing leading edge panel 35 by other attachment means including, for example, by fasteners. It is preferable that where fasteners are used, these do not have exposed fastener head in the outer aerodynamic surface of the wing.

The fastener retainer 43 may be made of a variety of materials. For example, the fastener retainer 43 may be of metal, composite (such as carbon fibre reinforced polymer), glass, etc. The upper wing leading edge panel 35 may comprise metal, such as aluminium, composite (such as carbon fibre reinforced polymer, for example) or may comprise a laminate construction including one or more metal plies and one or more composite plies. In the event that the inner surface 35b of the upper wing leading edge panel 35 is metallic and the fastener retainer 43 is also made of metal then welding of the fastener retainer 43 to the inner surface 35*b* of the upper leading panel 35 becomes possible as an alternative to bonding and/or fastening to attach these components together.

The upper wing leading edge panel 35 is installed to the upper wing cover 31 as follows. The plurality of fasteners 42 are inserted in the respective through holes 43*b* in the fastener retainer 43 such that the fastener heads 42*a* are situated in the recess 43*a* in the fastener retainer 43. The faster retainer 43 is then attached to the inner surface 35*b* of the upper wing leading edge panel 35 as discussed above. At this point, the plurality of fasteners 42 become "captive" fasteners since they can no longer be removed from the fastener retainer 43 due to the larger diameter of the fastener heads 42*a* than the diameter of the through holes 43*b* in the fastener retainer 43. The upper wing leading edge panel 35 is then positioned with respect to the upper wing cover 31 to align the plurality of fasteners 43 with the through holes 44 in the joggle 39 of the upper wing cover 31. Once the upper wing leading edge panel 35 is appropriately aligned with the upper wing cover 31 such that the plurality of the fastener shanks 42*b* each project through their respective through holes 44 in the upper wing cover 31 and project from the inner surface 31*b* thereof, the respective fastener receptacles 45 are then threadably secured onto the projecting threaded ends of the fasteners 42.

To replace the leading edge panel 35, the fastener receptacles 45 are removed from the fasteners 42 by access through the cavity 38 in the wing 30, which may require deployment of the Krueger high lift device. Once all fasteners 42 are released the panel 35 can be removed from the wing 30. A replacement panel 35 having a plurality of replacement fasteners 42 and a replacement fastener retainer 43 installed thereon may then be offered up to the wing 30. Once all of the fastener receptacles 45 are installed on the fasteners 42 the Krueger may then be moved back to its retracted position.

The captive fasteners allow for a reduction in the number of exposed fastener heads in the outer aerodynamic surface of the wing. This is particularly beneficial in areas where the local flow is expected to be laminar as it enables laminar flow to be maintained as far as possible in the downstream flow direction. Secondly, the captive fasteners enable faster installation and removal of the panel 35 from the wing 30 as compared with traditional countersunk fasteners such as illustrated in FIG. 2. This improves manufacturing times for new aircraft and reduced maintenance downtime.

Inspection of the fasteners 42 may require deployment of the Krueger high lift device to open aperture 38 to allow access to the fastener receptacles 43 visually or physically.

Figure 6:
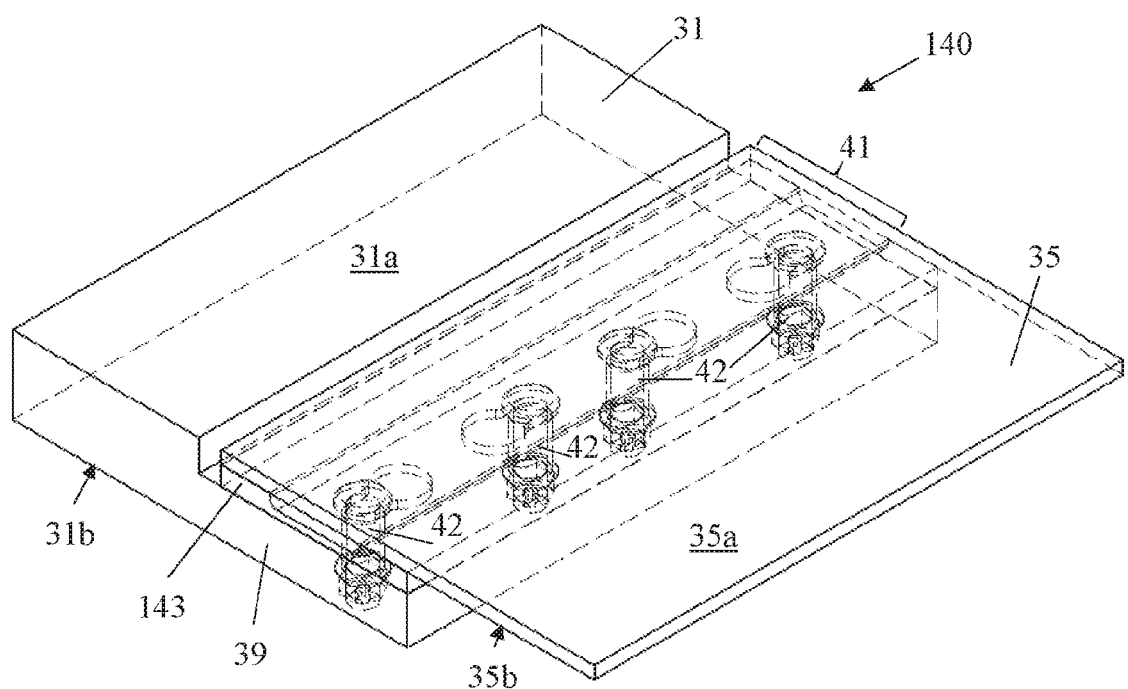
FIG. 6 illustrates a three dimensional view of a joint between a wing cover and a leading edge panel according to a second embodiment of the invention.
Figure 7:
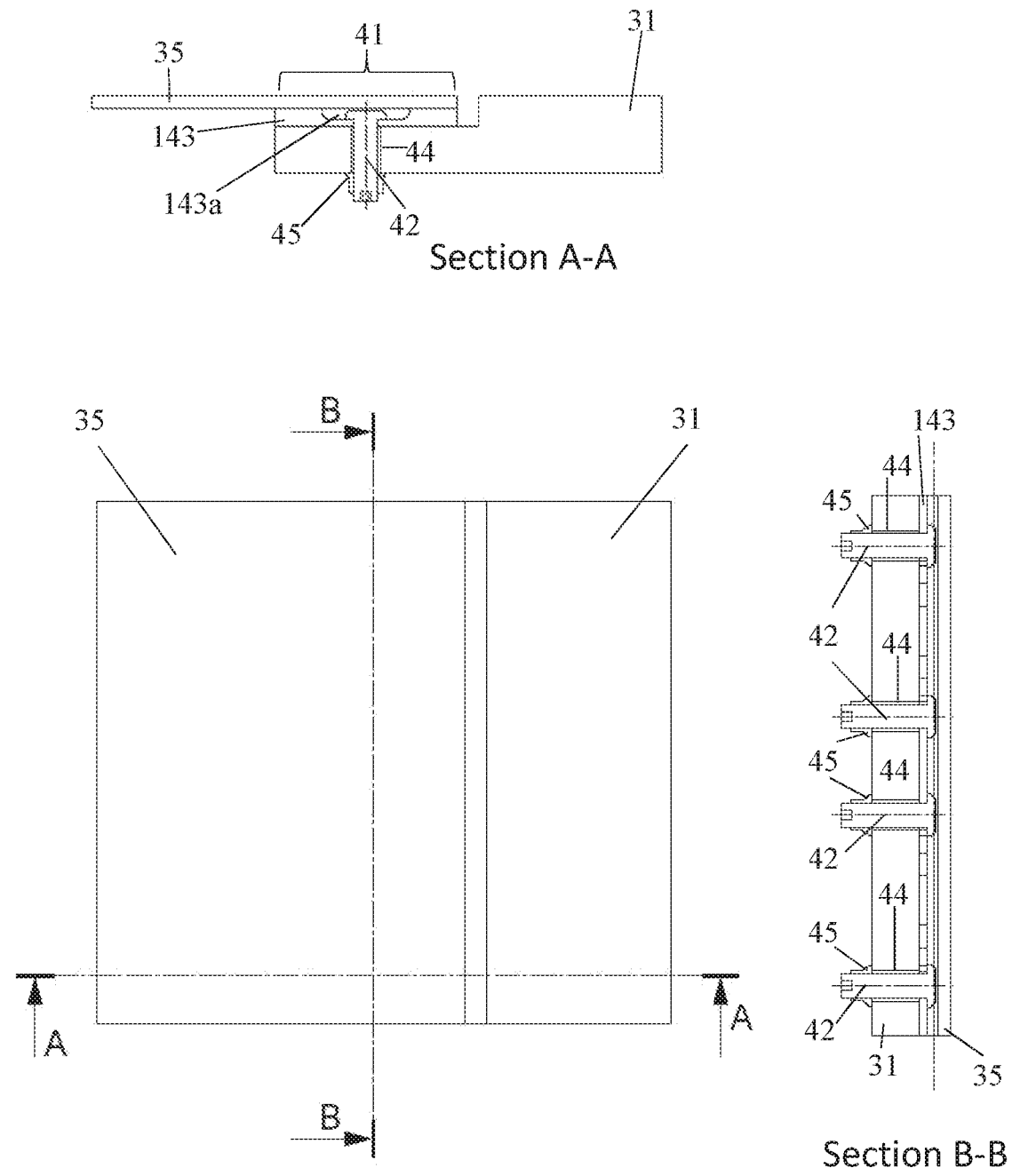
FIG. 7 illustrates plan and section views of the joint of the second embodiment.

FIG. 6 illustrates an isometric view of a joint 140 between the wing cover 31 and the leading edge panel 35 according to a second embodiment of the invention. Like reference numerals have been used to denote like parts and only those differences between the second embodiment and the first embodiment will be described in the following. As can be seen from FIG. 6 the upper wing cover 31, the upper wing leading edge panel 35, the overlap region 41, the fasteners 42 and the joggle 39 are identical to the first embodiment shown in FIGS. 4 and 5. The only difference between the joint 140 of the second embodiment and the joint 40 of the first embodiment arises in the fastener retainer 143.

Like the fastener retainer 43 of the first embodiment, the fastener retainer 143 of the second embodiment is arranged as a strip or plate having a grooved recess 143*a*. The dimensions, location, material, attachment to the upper wing leading edge panel 35 are identical to that of the fastener retainer 43 of the first embodiment. However, a hole 143*b* in the fastener retainer 143 for receiving the fastener 42 has a different shape that of the hole 43*b*.

The hole 143*b* is best shown in section view C-C of FIG. 8. The fastener retainer 143 has a through hole 143*b* having a generally figure of eight shape with a first aperture 143*c* having a diameter smaller than the diameter of the fastener head 42*a*, and a second aperture 143*d* adjacent to the first aperture 143*c* and having a diameter larger than the diameter of the fastener head 42*a*. A slot 143*e* joins the first aperture 143*c* to the second aperture 143*d*.

The through hole 44 in the upper wing cover 31 is co-axial with the first aperture 143*c* in the fastener retainer 143. The upper wing cover 31 has no through hole co-axial with the second aperture 143*d* of the fastener retainer 143. The fastener 42 is slidable in the slot 143*e* between the first aperture 143*c* and the second aperture 143*d* of the fastener retainer 143 only when the upper wing cover 31 and the upper wing leading edge panel 35 are disassembled (i.e. prior to assembly for the first time or after subsequent disassembly). The fastener 42 is removable from the fastener retainer 143 through the second aperture 143*d* only when the upper wing cover 31 and the upper wing leading edge panel 35 are disassembled. Therefore, unlike in the first embodiment, in the second embodiment the fasteners 42 are not "captive" fasteners once the fastener retainer 143 is attached to the inner surface 35*b* of the upper wing leading edge panel 35.

Assembly of the joint 140 is similar to that described above with reference to the first embodiment with the exception that the fastener 42 may be installed in the fastener retainer 143 after attaching the fastener retainer 143 to the upper wing leading edge panel 35. Once the fastener retainer 143 is attached to the upper wing leading edge panel 35 the fastener 42 is installed by passing the fastener head 42*a* through the second aperture 143*d* and sliding the fastener 42 laterally in the slot 143*e* until it rests in position in the first aperture 143*c*. Thereafter, assembly of the joint 140 is identical to that for the joint 40 of the first embodiment. Likewise, disassembly of the joint 140 is substantially identical to disassembly of the joint 40 of the first embodiment with the exception that once the fastener receptacles 45 are removed from the fasteners 42 and the panel 35 is removed from the aircraft wing 30, the fasteners 42 may be removed from the fastener retainer 143 by sliding the fasteners 42 laterally from the first aperture 143*c* to the second aperture 143*d* where upon the fasteners 42 may be removed through the second aperture 143*d*.

As shown in FIG. 6 the generally figure of eight shaped through holes 143*b* are oppositely handed consecutively along the row of fasteners 42 such that the first apertures 143*c* of adjacent through holes 143*b* are nearest each other. This provides a self-locking arrangement when the joint 140 is assembled.

All alternatives and variants described above with respect to the first embodiment are equally applicable to the second embodiment.

Figure 9:
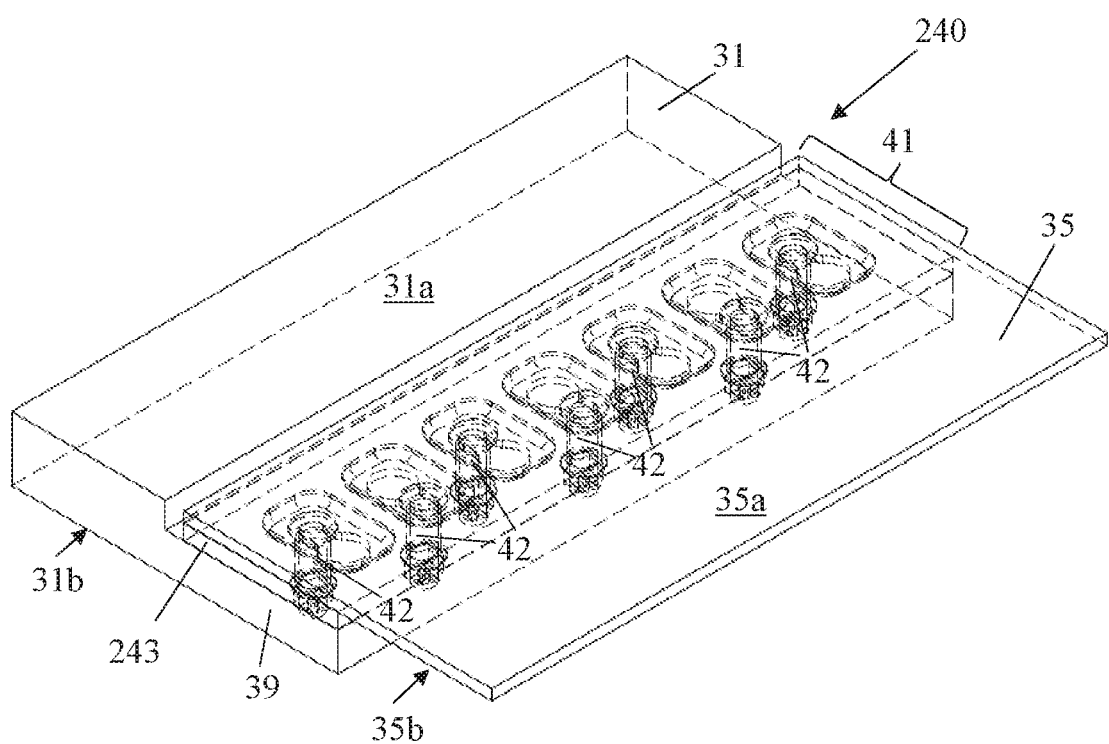
FIG. 9 illustrates a three dimensional view of a joint between a wing cover and a leading edge panel according to a third embodiment of the invention.
Figure 10:
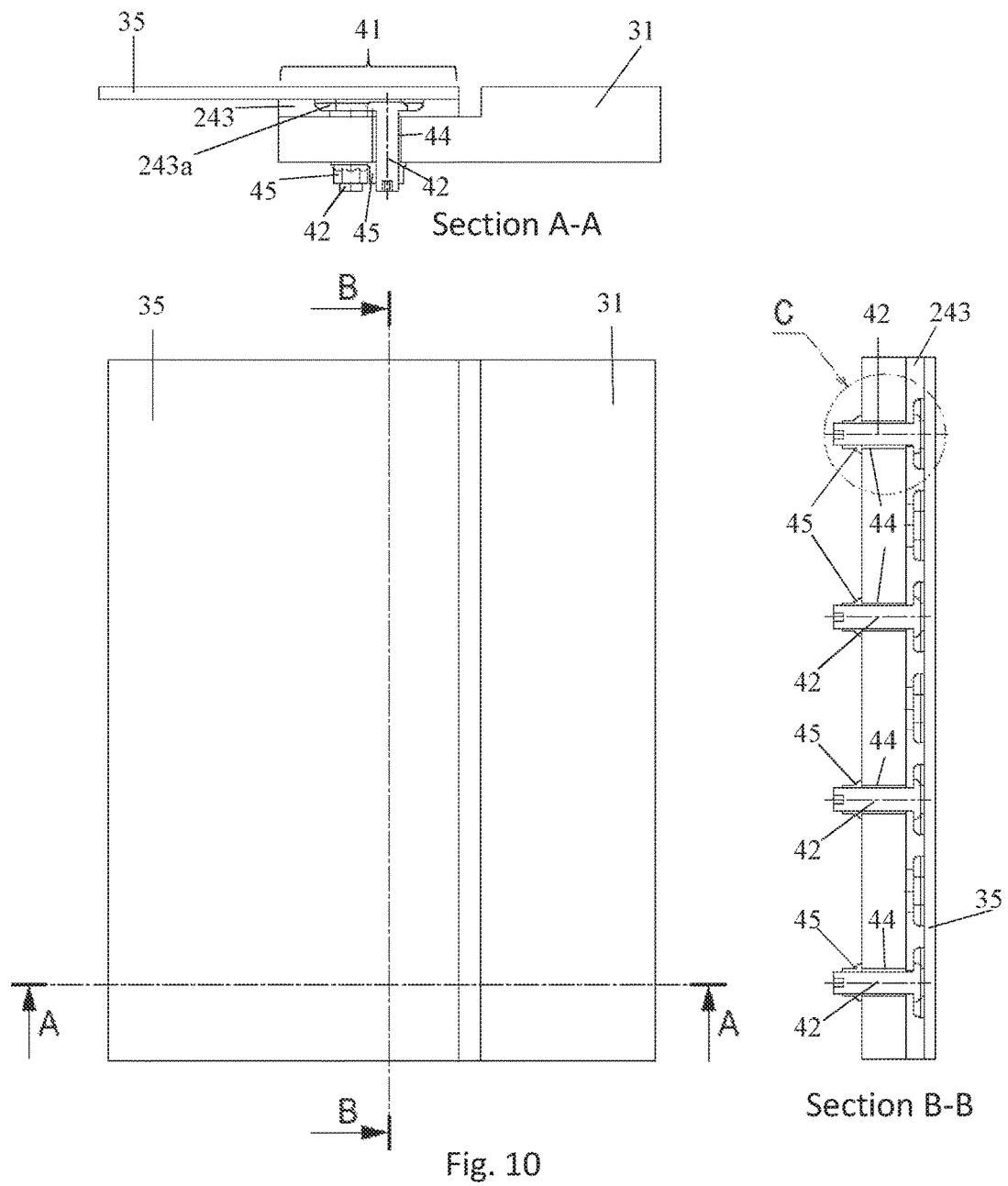
FIG. 10 illustrates plan and section views of the joint of the third embodiment.

FIG. 9 illustrates an isometric view of a joint 240 between the upper wing cover 31 and the upper wing leading edge panel 35 in accordance with a third embodiment of the invention. In the third embodiment like reference numerals are used to denote like parts with the second embodiment and only the differences between the third embodiment and the second embodiment will now be described. The only difference between the joint 240 of the third embodiment and the joint 140 of the second embodiment arises in the fastener retainer 243.

Like the fastener retainer 143 of the second embodiment, the fastener retainer 243 of the second embodiment is arranged as a strip or plate. The dimensions, location, material, attachment to the upper wing leading edge panel 35 are identical to that of the fastener retainer 143 of the second embodiment. However, whereas in the fastener retainer 143 the recess 143a is a channel groove extending along the length of the fastener retainer, the fastener retainer 243 has a plurality of discrete recesses 243a each for receiving respective fastener head 42a.

Situated in the base of each recess 243a is a through hole 243b having a generally figure of eight shape substantially identical to that of the through holes 143b of the second embodiment. Each through hole 243b has a first aperture 243c having a diameter smaller than the diameter of the fastener head 42a, and a second aperture 243d adjacent to the first aperture 243c and having a diameter larger than the diameter of the fastener head 42a. A slot 243e extends between the first aperture 243c and the second aperture 243d.

Whereas in the second embodiment the movement of the fastener 42 between the first and second apertures 143c and 143d is in a lateral direction along the row of fasteners 42, in the third embodiment the movement of the fasteners 42 from the first aperture 243c to the second aperture 243d is in a generally transverse direction perpendicular to the row of fasteners 42. Similar to the second embodiment, in the third embodiment the generally figure of eight shaped through hole 243b is oppositely handed for each consecutive recess 243a along the row of fasteners 42 such that the first apertures 243c are nearest the upper wing cover 31 for every other one of the fasteners 42 along the row of fasteners. This provides a self-locking arrangement when the joint 240 is assembled. The manner of attaching the fastener retainer 243 and the installation of the fasteners 42 is substantially identical to that of the second embodiment and so will not be repeated here.

All alternatives and variants described above with respect to the second embodiment are equally applicable to the third embodiment.

Although the invention has been described above with reference to one or more preferred embodiments, it will be appreciated that various changes or modifications may be made without departing from the scope of the invention as defined in the appended claims.

The invention claimed is:

1. A method of assembling an aircraft joint, the aircraft joint comprising:
   a first component;
   a second component;
   a fastener having a head and a shank, and;
   a fastener retainer having a recess and a through hole;
the method comprising:
   inserting the fastener shank through the hole in the fastener retainer until the fastener head is situated in the recess in the fastener retainer;
   attaching the fastener retainer to the second component;
   positioning the second component having the fastener retainer attached thereto and with the fastener therein with respect to the first component so that the second component overlaps the first component at an overlap region and the fastener retainer is fixedly attached to the second component at the overlap region with the fastener head situated between the fastener retainer and the second component and the fastener shank extending into the first component; and then
   fastening the first component to the second component using the fastener.

2. A method according to claim 1, wherein the fastener retainer is attached to the second component prior to inserting the fastener shank through the hole in the fastener retainer.

3. A method according to claim 1, wherein the fastener retainer is attached to the second component after inserting the fastener shank through the hole in the fastener retainer.

4. A method according to claim 1, wherein the fastener shank is threaded.

5. A method according to claim 1, further comprising attaching a fastener receptacle to the fastener shank.

6. A method according to claim 1, further comprising attaching the fastener retainer to the second component by one or more of bonding, fastening or welding.

7. A method according to claim 1, wherein the fastener retainer is a plate or strip.

8. A method according to claim 1, wherein the through hole in the fastener retainer has a diameter smaller than a diameter of the fastener head.

9. A method according to claim 1, wherein the through hole in the fastener retainer has a first aperture having a diameter smaller than a diameter of the fastener head, and a second aperture adjacent the first aperture and having a diameter larger than the diameter of the fastener head, and a slot between the first aperture and the second aperture.

10. A method according to claim 9, further comprising sliding the fastener in the slot between the first aperture and the second aperture of the fastener retainer.

11. A method according to claim 1, further comprising a plurality of the fasteners, wherein the fastener retainer has a plurality of through holes, each fastener head is situated in a recess of the fastener retainer and between the fastener retainer and the second component, and each fastener shank extends through a respective one of the through holes and into the first component.

12. A method according to claim 1, wherein the first component has an outer aerodynamic surface, and the second component has an outer aerodynamic surface, and the fastener constrains movement of the first component relative to the second component in a direction normal to the outer aerodynamic surfaces of first and second components in the vicinity of the fastener.

13. A method according to claim 12, wherein the outer aerodynamic surfaces of the first and second components are substantially flush across the joint.

14. A method according to claim 1, wherein the first and second components are an aircraft wing cover and an aircraft wing leading edge panel.

* * * * *